United States Patent Office 2,712,997
Patented July 12, 1955

2,712,997

PREPARING ANIMAL FEED

Maxwell L. Cooley, Minneapolis, Minn., assignor to General Mills, Inc., a corporation of Delaware No Drawing. Application May 28, 1952,
Serial No. 290,579

4 Claims. (Cl. 99—2)

The present invention relates to a method of determining the relative uniformity with which small quantities of physiologically active materials have been incorporated in food and drug products. The invention is particularly adapted to use in checking uniformity in which vitamins and antibiotic materials are distributed in animal feeds, and accordingly will be described with particular reference thereto. It will be apparent, however, that the invention is applicable to food, feed and drug products in general.

Most physiologically active materials are added to feeds in extremely minute quantities. This is particularly true when the physiologically active material is available in pure form. In adding a small quantity of such a material to a large volume of feed, difficulty is experienced in securing uniform distribution. In general it is essential that these physiologically active materials be fed to the animals in controlled amounts. Accordingly, it is usually desirable to insure that the feed contains not only a minimum, but also not in excess of a maximum amount of the particular physiologically active material. A further difficulty in insuring uniformity is the fact that many of these physiologically active materials are complex molecules for which no simple, quick method of analytical determination is available. In some instances, the feeds may contain, in addition to the physiologically active material, other materials which are closely related chemically, but which have no physiological activity. Under these circumstances, satisfactory chemical methods are frequently not available for the determination of the quantity of physiologically active material. It is frequently necessary, therefore, to determine the quantity of the particular physiologically active material by biological methods involving feeding tests on rats or other animals for extended periods of time. Where such an extended time period is required for determining the physiologically active material, it will be apparent that such a method cannot be used at the point of manufacture to determine the relative uniformity of distribution of the physiologically active material in the mix. In order to use such a method, it would be necessary to store the entire quantity of the feed until the assays had been received, and then either release the product for sale or return it for further processing.

There have been some attempts to solve this problem, but they have left much to be desired. One such method is to be found in U. S. Patent 2,157,755, in which a vitamin-containing oil is mixed with a fat soluble dye and the colored solution thus produced is intimately mixed into an animal feed. The mixing is presumably carried out until the dye is uniformly distributed in the feed as determined by visual examination. The dyes employed are expensive and very large quantities are required in order to color the feed to any reasonable degree. The method, therefore, is quite expensive. In addition, most animal feeds are composed of materials which contain considerable quantities of pigment. These pigments tend to obscure the coloring effect of the dye, and accordingly it is difficult by visual examination to determine the uniformity of distribution of the dye.

Another suggested method has involved the use of radioactive materials which are preliminarily thoroughly mixed with a physiologically active material, and thereafter the mixture is thoroughly mixed with the animal feed. The relative uniformity of distribution can then easily be traced by determining the relative uniformity of the radioactivity of samples of the feed. The radioactive materials employed for this method are extremely expensive, and the method is, therefore, impractical for that reason.

It has now been discovered that soluble inorganic nitrites, such as sodium or potassium nitrite, may be used as tracers to follow the relative uniformity with which physiologically active materials are distributed in food and drug products. These inorganic nitrites are inexpensive and non-toxic at the levels recommended. They are reasonably stable and they may be determined analytically in a very short period of time. The use of these nitrites eliminates the objections which are found in the other methods described above. Furthermore, most feed materials are substantially free from nitrite, and accordingly there is no natural content of nitrite which would interfere with the accuracy of the determination.

It is, therefore, an object of the present invention to provide a novel method of insuring uniformity of distribution of physiologically active materials in foods and drugs by means of soluble inorganic nitrites. It is another object of the present invention to provide novel products containing such nitrites.

In general, the invention involves the admixture of a soluble nitrite such as sodium nitrite with the physiologically active material. Usually it is desirable to prepare a premix containing some inert carrier in addition to the physiologically active material and the nitrite, since the quantity of the nitrite and of the physiologically active material for any given batch of material is not particularly large. This premix is then thoroughly agitated, and the uniformity of the mixture may be ascertained by determining the uniformity of distribution of the nitrite in this premix. Usually, however, this latter step is unnecessary because, where relatively small quantities are involved, uniformity of distribution can readily be achieved by ordinary mixing. When the premix is uniform, the desired quantity may be admixed with a feed containing conventional ingredients, such as cereal and oil seed materials, and the entire mixture subjected to thorough agitation until selected samples show a uniform distribution of nitrite.

The nitrite may be used in varying concentrations in the premix, the particular concentration being correlated with the relative quantity of the physiologically active material and with the level of physiological activity desired in the ultimate product. Usually it is preferred to employ a concentration of nitrite such that the final product has a concentration of nitrite of at least ten parts per million. In many instances, the concentration of nitrite in the premix may be around 5% by weight.

A variety of carriers may be employed in the premix and it is preferred that the inert carrier be finely powdered rather than in a granular form. The analytical determination of the quantity of nitrite involves an aqueous extraction of the product, and consequently it is preferred to employ a finely divided carrier to facilitate this aqueous extraction. Suitable carriers include fuller's earth and bentonite. The nitrite is more stable in an alkaline medium. Therefore, where it is desired to have a product which is stable for several weeks or more, the carrier should have a pH of not less than 7.4. In case the carrier is not alkaline, addition of sodium carbonate or sodium bicarbonate is desirable to bring the pH up to the desired point. Fuller's earth is preferred to bentonite because it does not form a gel (as does bentonite) with water. Aqueous extraction of the nitrite from a fuller's earth carrier, therefore, is facilitated.

Example 1

Two premixes were made as follows:

Premix 1

|  | Parts |
|---|---|
| Fuller's earth (Florex XXX) | 107.3 |
| NaNO₂ (100 mesh) | 5.7 |
| Procaine penicillin | 1.0 |
| Total | 114.0 |

Premix 2

|  | Parts |
|---|---|
| Bentonite (200 mesh) | 107.3 |
| NaNO₂ (100 mesh) | 5.7 |
| Procaine penicillin | 1.0 |
| Total | 114.0 |

Control Premix 1

|  | Parts |
|---|---|
| Fuller's earth (Florex XXX) | 113 |
| Procaine penicillin | 1 |
| Total | 114 |

Control Premix 2

|  | Parts |
|---|---|
| Bentonite (200 mesh) | 113 |
| Procaine penicillin | 1 |
| Total | 114 |

These mixes were thoroughly agitated and were then tested for nitrite immediately after mixing, after two weeks and after four weeks. The results obtained are indicated in the following table:

|  | Theoretical Percent | Found | | |
|---|---|---|---|---|
|  |  | Initial Percent | 2 weeks Percent | 4 weeks Percent |
| Control Premix 1 | None | Trace | Trace | Trace |
| Control Premix 2 | None | Trace | Trace | Trace |
| Premix 1 | 5.0 | 5.30 | 5.10 | 5.18 |
| Premix 2 | 5.0 | 4.97 | 4.90 | 4.95 |

Since the concentration actually found was equal to the theoretical concentration, within experimental error, the mixture was uniform. Furthermore, these data indicate the nitrite to be stable over reasonable periods of time.

Example 2

A series of animal feeds was prepared employing premixes 1 and 2. In feed mixes 1–3 in the following table, premix 1 was employed in the quantity required to give the indicated nitrite concentration, and in feed mixes 4–6, premix 2 was employed to give the nitrite concentration indicated. The mixtures were thoroughly agitated and then a sample analyzed after mixing, after two weeks and after four weeks. The analyses are indicated in the following table, together with the analyses of corresponding control feed mixes which were of identical composition except that they contained no premix.

| Feed Mix | Theoretical p. p. m. | Found | | |
|---|---|---|---|---|
|  |  | Initial p. p. m. | 2 weeks p. p. m. | 4 weeks p. p. m. |
| 1 | 12.5 | 11.0 | 9.6 | 10.0 |
| 2 | 25.0 | 26.0 | 24.0 | 25.0 |
| 3 | 50.0 | 46.0 | 50.0 | 48.0 |
| 4 | 12.5 | 10.0 | 10.0 | 11.0 |
| 5 | 25.0 | 24.8 | 23.0 | 23.8 |
| 6 | 50.0 | 46.0 | 43.0 | 45.0 |

| Control Feed Mix | Theoretical p. p. m. | Found | | |
|---|---|---|---|---|
|  |  | Initial p. p. m. | 2 weeks p. p. m. | 4 weeks p. p. m. |
| 1 | None | 1.2 | .9 | 1.0 |
| 2 | None | None | None | None |
| 3 | None | 2.0 | 1.8 | 1.2 |
| 4 | None | 1.6 | 1.2 | 1.5 |
| 5 | None | None | None | None |
| 6 | None | 0.8 | 1.0 | 0.5 |

Example 3

A premix was prepared from 90 parts of a vitamin D preparation, 5 parts of sodium nitrite (200 mesh) and 5 parts of a stabilizer composed of equal parts of sodium thiosulfate and sodium carbonate. The vitamin D preparation contained 2,000 units of vitamin D per gram and was composed of the vitamin D on a granular edible carrier.

The premix was thoroughly agitated, and then analyzed for sodium nitrite. It was found to contain 4.88% of nitrite.

Three feeds were prepared containing the premix such that the feeds contained 20, 35 and 50 parts per million respectively of nitrite. The feeds were thoroughly agitated and then tested for nitrite. The results are found in the following table:

| Feed | p. p. m. cal'd | Sodium Nitrite | |
|---|---|---|---|
|  |  | p. p. m. found | control, p. p. m. |
| Broiler feed | 20 | 18 | 0.9 |
| Egg mash | 35 | 32 | 1.0 |
| Mash concentrate | 50 | 49 | 2.0 |

I claim as my invention:

1. Process of preparing an animal feed containing an antibiotic which comprises preparing a premix containing the antibiotic, a soluble nitrite and an inert carrier, thoroughly mixing the premix until the composition is uniform, adding the premix to the remaining ingredients of an animal feed and agitating the animal feed until the composition is uniform as determined by nitrite content.

2. Process of preparing an animal feed containing a vitamin which comprises preparing a premix containing the vitamin, the soluble nitrite and an inert carrier, thoroughly agitating the premix until the composition is uniform, adding the premix to the remaining ingredients of the animal feed and thoroughly agitating the animal feed until it is uniform as determined by nitrite content.

3. Process of preparing an animal feed containing an antibiotic which comprises preparing a premix containing the antibiotic, a soluble nitrite and finely divided fuller's earth, thoroughly mixing the premix until its composition is uniform, adding the premix to the remaining ingredients of the animal feed and agitating the resultant mixture until it is uniform as determined by nitrite content.

4. Process of preparing an animal feed containing a vitamin which comprises preparing a premix containing the vitamin, a soluble nitrite and an edible carrier, thoroughly agitating the premix until the composition is uniform, adding the premix to the remaining ingredients of the animal feed and thoroughly agitating the resultant mixture until composition is uniform as determined by nitrite content.

References Cited in the file of this patent

UNITED STATES PATENTS

| | | |
|---|---|---|
| 2,160,168 | Pfeiffer | May 30, 1939 |
| 2,550,255 | Jensen et al. | Apr. 24, 1951 |

OTHER REFERENCES

Modern Drug. Ency. and Therapeutic Index, Howard, 4th ed. Drug Pub. Inc., N. Y. C., 1949, page 928.